(12) United States Patent
Wiethorn (10) Patent No.: US 11,214,944 B2
(45) Date of Patent: Jan. 4, 2022

(54) HEAVY EQUIPMENT HAZARD WARNING APPARATUS AND SYSTEM AND METHOD FOR USE OF SAME

(71) Applicant: Jim D. Wiethorn, Sugar Land, TX (US)

(72) Inventor: Jim D. Wiethorn, Sugar Land, TX (US)

( * ) Notice: Subject to any disclaimer, the term of this patent is extended or adjusted under 35 U.S.C. 154(b) by 0 days.

(21) Appl. No.: 16/585,781

(22) Filed: Sep. 27, 2019

(65) Prior Publication Data

US 2021/0079628 A1   Mar. 18, 2021

Related U.S. Application Data (60) Provisional application No. 62/899,593, filed on Sep. 12, 2019.

(51) Int. Cl.
| | |
|---|---|
| *E02F 9/26* | (2006.01) |
| *B60Q 9/00* | (2006.01) |
| *E02F 9/24* | (2006.01) |
| *B66F 17/00* | (2006.01) |
| *B66C 15/06* | (2006.01) |
| *E04G 21/24* | (2006.01) |
| *E02F 9/20* | (2006.01) |
| *B66C 23/88* | (2006.01) |

(52) U.S. Cl.
CPC ............... *E02F 9/261* (2013.01); *B60Q 9/00* (2013.01); *B66C 15/06* (2013.01); *B66C 15/065* (2013.01); *B66F 17/003* (2013.01); *E02F 9/24* (2013.01); *E04G 21/24* (2013.01)

(58) Field of Classification Search
CPC .... E02F 9/261; E02F 9/24; B60Q 9/00; B66F 17/003; B66C 15/06; B66C 15/065; E04G 21/24
See application file for complete search history.

(56) References Cited

U.S. PATENT DOCUMENTS

| | | | |
|---|---|---|---|
| 7,482,973 B2 | 1/2009 | Tucker et al. | |
| 8,081,112 B2 | 12/2011 | Tucker et al. | |
| 8,290,204 B2 | 10/2012 | Nielsen et al. | |
| 9,081,109 B1 | 7/2015 | Olsson et al. | |
| 9,238,570 B2* | 1/2016 | Schoonmaker | ......... B66C 13/18 |
| 9,292,813 B2 | 3/2016 | Tucker et al. | |
| 9,542,824 B2* | 1/2017 | Beggs | .................. B60Q 1/2673 |
| 9,547,969 B2* | 1/2017 | Beggs | .................. B66F 17/003 |
| 9,607,496 B2* | 3/2017 | Beggs | .................... B60Q 9/008 |
| 9,633,537 B2* | 4/2017 | Beggs | .................... B60Q 9/008 |
| 9,672,713 B2* | 6/2017 | Beggs | ...................... B60Q 1/26 |

(Continued)

*Primary Examiner* — Frederick M Brushaber
(74) *Attorney, Agent, or Firm* — Scott Griggs; Griggs Bergen LLP (57) ABSTRACT

A heavy equipment hazard warning apparatus for a piece of heavy equipment at a site and a system and method for use of the same are disclosed. In one embodiment of the heavy equipment hazard warning apparatus, the location of the heavy equipment is monitored by the heavy equipment warning apparatus and analyzed with reference to a hazard safety site plan of the site that identifies a hazard such as existing utilities, for example. An alert notification is initialized in response to the heavy equipment encroaching on a hazard geofence around the hazard. A shutdown notification is initialized in response to the heavy equipment being proximate to the hazard.

20 Claims, 5 Drawing Sheets

(56) References Cited

U.S. PATENT DOCUMENTS

| | | | |
|---|---|---|---|
| 9,703,002 | B1 | 7/2017 | Olsson et al. |
| 10,405,070 | B2 | 9/2019 | Schwarzkopf et al. |
| 10,671,089 | B2* | 6/2020 | Tojima .................. G05D 1/028 |
| 2011/0279261 | A1* | 11/2011 | Gauger ..................... F16P 3/16 |
| | | | 340/539.1 |
| 2013/0013251 | A1* | 1/2013 | Schoonmaker ......... B66C 13/46 |
| | | | 702/152 |
| 2014/0200863 | A1 | 7/2014 | Kamat et al. |
| 2016/0107866 | A1* | 4/2016 | Schoonmaker ......... B66C 13/18 |
| | | | 701/50 |
| 2016/0224029 | A1* | 8/2016 | Tojima ................ G05D 1/0278 |
| 2016/0343140 | A1 | 11/2016 | Ciprari et al. |
| 2017/0265029 | A1 | 9/2017 | Drew et al. |
| 2019/0325174 | A1* | 10/2019 | Ashaari ............ G06K 19/07758 |

\* cited by examiner

HEAVY EQUIPMENT HAZARD WARNING APPARATUS AND SYSTEM AND METHOD FOR USE OF SAME

PRIORITY STATEMENT & CROSS-REFERENCE TO RELATED APPLICATIONS

This application claims priority from U.S. Patent Application No. 62/899,593, entitled "Heavy Equipment Hazard Warning Apparatus and System and Method for Use of Same" and filed on Sep. 12, 2019, in the name of Jim D. Wiethorn; which is hereby incorporated by reference for all purposes.

TECHNICAL FIELD OF THE INVENTION

This invention relates, in general, to heavy equipment and, in particular, to a heavy equipment hazard warning apparatus and a system and method for use of the same for earthwork equipment, construction equipment, and the like, that enables crane owners, operators, and manufacturers to provide a means to evaluate potential known hazards, such as existing utilities at a site, to avoid catastrophic events and protect workers.

BACKGROUND OF THE INVENTION

Without limiting the scope of the invention, the background will be described with reference to crane accidents, as an example. Crane accidents and operational issues are very dramatic and very visible, often resulting in viral videos and media attention. Worse, crane accidents may cause property damage, injury, and even death. Crane accident research data, consensus national standards and state and local municipalities prescribe certain safety practices and equipment to enable safe operating procedures. Identifying and avoiding hazards such as existing utilities like overhead power lines is critical to ensuring safe crane operation. There is a continued need for improved systems and methods to identify and avoid hazards such as existing utilities.

SUMMARY OF THE INVENTION

It would be advantageous to mitigate the risks of operating heavy equipment such as earthwork equipment and construction equipment. It would also be desirable to enable a computer-based and mechanical-based solution that is easily and quickly deployed without the need for a complex technical analysis. To better address one or more of these concerns, a heavy equipment hazard warning apparatus for a piece of heavy equipment at a site and a system and method for use of the same are disclosed. In one embodiment of the heavy equipment hazard warning apparatus, the location of the heavy equipment is monitored by the heavy equipment warning apparatus and analyzed with reference to a hazard safety site plan of the site that identifies a hazard such as existing utilities, for example. An alert notification is initialized in response to the heavy equipment encroaching on a hazard geofence around the hazard. A shutdown notification is initialized in response to the heavy equipment being proximate to the hazard. This heavy equipment hazard warning apparatus, along with the system and method and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Figure 1:
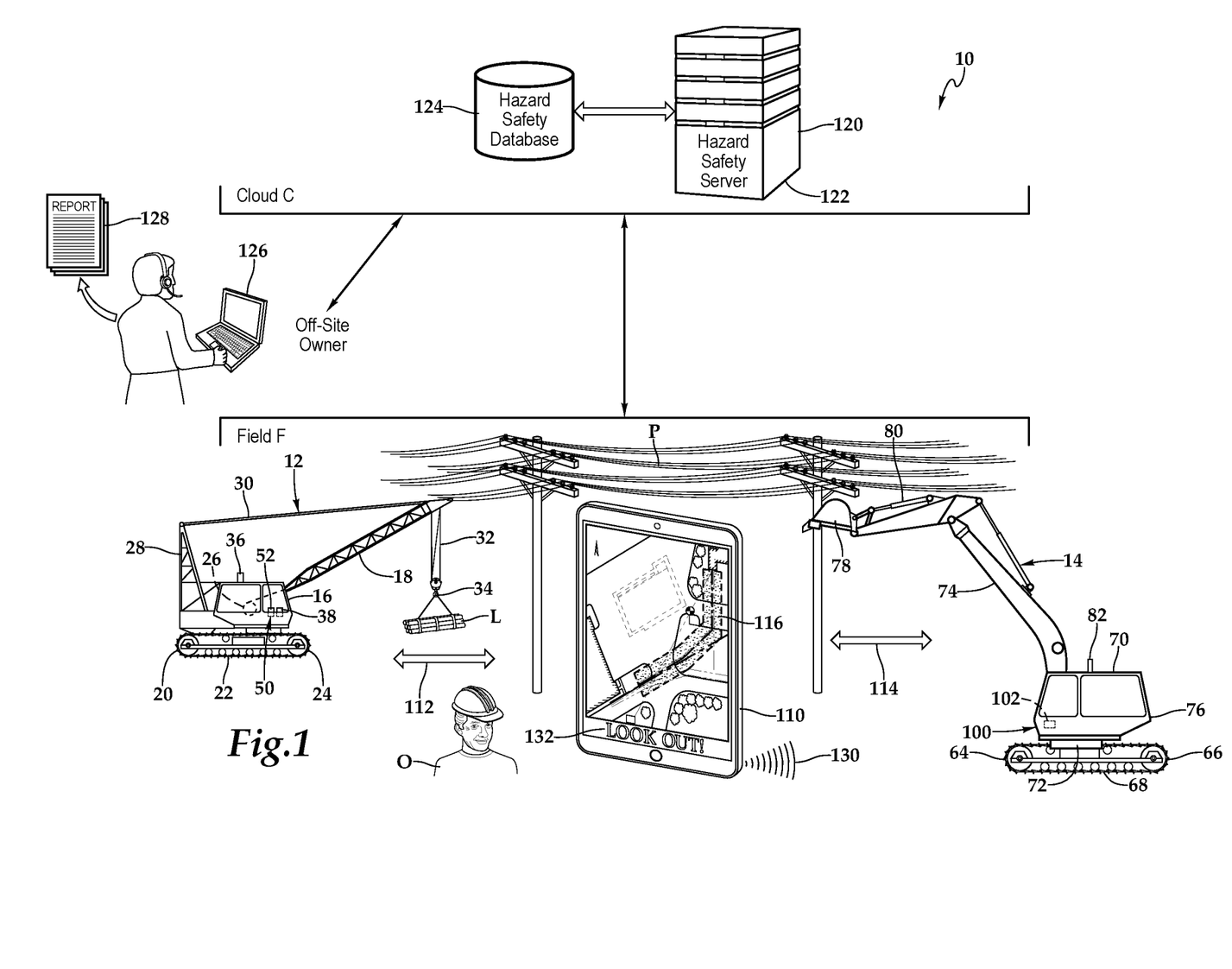
FIG. 1 is a schematic block diagram depicting one embodiment of a system utilizing heavy equipment hazard warning apparatuses on multiple pieces of heavy equipment, according to the teachings presented herein.

Referring initially to FIG. 1, therein is depicted one embodiment of a system for providing hazard safety that is schematically illustrated and generally labeled 10. Heavy equipment shown as a crawler crane 12 and an excavator 14 are positioned at a site which is shown as a job site at a field F having a hazard in the form of an existing utility, overhead power lines P. It should be appreciated that although a crawler crane and an excavator are depicted, the teachings presented herein work with any type of heavy equipment such as earthwork equipment or construction equipment, for example. By way of further example and not by way of limitation, the heavy equipment may be a piece of equipment such as a drilling rig, crane, crawler crane, tower crane, concrete pump, dump truck, aerial lift, scissor lift, high reach equipment, forklift, scissor lift truck, track hoe, back hoe, excavator, and large ditching machine.

As shown, the crawler crane 12 includes a crane body 16 having a boom 18 mounted thereto so as to be hoisted and lowered. Additionally, a lower undercarriage 20 with a set of parallel tracks 22 having endless treads 24 provide stability and mobility to the crawler crane 12. A winch 26 is also secured to the crane body 16 to drive the boom 18 to be hoisted and lowered through a gantry 28 and boom hoist assembly 30. A hoist cable 32 is drawn out of the winch 26 along the boom 18 and is suspended from the extreme end of the boom 18 to suspend a hook 34 suspended by many cables. By the hoist means constituted as described above, the main winding and hoisting work for raising and lowering mainly a very heavy load L, depicted as beams, at a low speed with each lift and lowering being a lift cycle. Safety features, such as a siren 36 mounted on the top of the crane body 16, provide various notifications and precautions to improve safety when the crane 12 is too close to a hazard, such as a utility represented by the overhead power lines P at the field F. It should be appreciated, however, that although the overhead power lines P are presented as an example of a utility, the utility may include a utility such as electrical, gas, water cable or telecommunications, for example and the accompanying infrastructure such as electrical power infrastructure, gas infrastructure, water infrastructure, cable infrastructure, and telecommunications infrastructure, for example.

A load moment indicator 38 is secured to the crawler crane 12 to monitor crane functions to provide an operator of the crawler crane 12 with a continuous reading of a rated capacity of the crawler crane 12 as the crawler crane 12 and the boom 18 move through motions to make a lift of the load L to complete a lift cycle. The severity of a load cycle is based on the relationship of the load weight to the allowable load permitted by the load chart and expressed as a percent capacity. A heavy equipment hazard warning apparatus 50 having a housing 52 may be located integral with the crawler crane 12 and may be located in communication with the load moment indicator 38. As will be discussed in further detail hereinbelow, the heavy equipment hazard warning apparatus 50 collects heavy equipment data, such as vehicle operating information, for monitoring and reporting purposes, as well as monitors the location of the crawler crane 12 to ensure that that the crawler crane 12 does not encroach upon and contact the overhead power lines P. In one implementation, the heavy equipment hazard warning apparatus 50 may at least partially integrated with the load moment indicator 38 or a crane risk logic apparatus, as described in U.S. patent application Ser. No. 16/555,117 entitled, "Crane Risk Logic Apparatus and System and Method for Use of Same" and filed on Aug. 29, 2019 in the name of Jim D. Wiethorn, which is hereby incorporated by reference for all purposes.

The excavator 14 includes a lower undercarriage 64 with a set of parallel tracks 66 having endless treads 68 which provide stability and mobility to the excavator 14. The lower undercarriage 64 supports a body 70 with a turning joint 72 being interposed between the lower undercarriage 64 and the body 70. A boom 74 is balanced by a counterweight 76 and the boom 74 supports a bucket 78 under the control of the bucket cylinder 80. A warning device 82 with a light and siren is positioned on the body 70. A heavy equipment hazard warning apparatus 100, having a housing 102, is located integral with the excavator 14. As will be discussed in further detail hereinbelow, the heavy equipment hazard warning apparatus 100 collects heavy equipment data for monitoring and reporting purposes, as well as monitors the location of the excavator 14 to ensure that that the excavator 14 does not encroach upon and contact the overhead power lines P.

A smart device 110 is located in the field F proximate the crawler crane 12 and the excavator 14. As shown, the smart device 110 is being utilized by an operator O. In one embodiment, the smart device 110 is utilized to create a hazard safety plan 116 of the job site at the field F prior to the arrival or use of the crawler crane 12 and the excavator 14. As will be discussed in further detail hereinbelow, the hazard safety plan 116 is a site plan of the site, which is the field F, augmented with locationing information for a hazard with a geofence therearound. As mentioned, the hazard is the overhead power lines P. Once the hazard safety plan 116 is complete, the hazard safety plan 116 is provided to each of the heavy equipment hazard warning apparatuses 50, 100 respectively associated with the crawler crane 12 and the excavator 14. Using the geolocationing functionality, each of the hazard warning apparatuses 50, 100 may provide a warning if the respective crawler crane 12 or the excavator 14 encroaches too close to the overhead power lines P. The warning may be audio and/or visual and be provided by the warning device 36 of the crawler crane 12 or the warning device 82 of the excavator 14. The warning device 36 and the warning device 82 may be types of audiovisual alert devices associated with the heavy equipment, which may also include sirens, warning lights, instrument panels, and displays, for example. Further, using the geolocationing functionality, each of the hazard warning apparatuses 50, 100 may initialize at least a partial shutdown of the respective crawler crane 12 or the excavator 14 if the respective crawler crane 12 or the excavator 14 is about to make contact with the overhead power lines P. In the instance of a shutdown being implemented, the audiovisual warnings may have been ignored. Also, in one embodiment, the smart device 110 forms a pairing, such as pairing 112 or pairing 114, with one or each of the heavy equipment apparatuses 50, 100 in order to facilitate monitoring and reporting purposes, maintain the location of the crawler crane 12 or excavator 14, and, in particular, monitor the location of the crawler crane 12 or excavator 14 with respect to the overhead power lines P.

As shown, a hazard safety server 120 having a housing 122 and access to a hazard safety database 124 provides an interface and functionality to the field F, including the heavy equipment hazard warning apparatus 50 associated with the crawler crane 12 and the heavy equipment hazard warning apparatus 100 associated with the excavator 14. An off-site owner 126 is located in communication with the services offered by the cloud C. The off-site owner 126 may run various reports 128 to give visibility into how the crawler crane 12 or the excavator 14 are being operated in the field F. This can also identify any potential hazardous operations or abuse.

In one implementation, the on-site operator O at the field F utilizes the smart device 110 as part of a daily inspection program, wherein the smart device 110 offers an application that serves as a guide for conducting the daily inspection. As mentioned, the smart device 110 located in the cab may also be used by the operator O to facilitate monitoring and reporting purposes and maintain the location of heavy equipment. The smart device 110 transmits data to the cloud C that can be monitored by multiple parties. As previously mentioned, the smart device 110 is paired with each of the heavy equipment hazard warning apparatus 50 at crawler crane 12 and the heavy equipment hazard warning apparatus 100 at the excavator 14. The smart device 110 is also in communication with the services offered by the cloud C. As shown, the operator O is utilizing the smart device 110 to monitor the operation of the heavy equipment and receive warnings, such as audio warning 130 and visual warning 132 about a piece of heavy equipment being too close to a hazard such as the overhead power lines P. In one embodiment, the functionality of the smart device 110 may be incorporated into the heavy equipment hazard warning apparatuses 50, 100, or, alternatively, the heavy equipment hazard warning apparatuses 50, 100 may include displays and audiovisual functionality. In one implementation, warnings may escalate as the distance between the hazard and heavy equipment decreases. As mentioned, the notifications and warnings generated by the heavy equipment apparatuses 50, 100 or the smart device 110 may include notifications to the smart device 110, such as alerts 130, 132, or notifications and warnings through the safety features 36 of the crawler crane 12 or the safety features 82 of the excavator 14.

With respect to the daily inspection, as part of a safety protocol, each item that is reviewed and checked is submitted to the hazard safety server 120 and the hazard safety database 124 prior to obtaining any necessary signatures to begin operation. Any deficiencies may be sent to the off-site owner 126 for maintenance once the crane 12 returns. In the event that a condition exists that is considered a safety issue, then the off-site owner 126 may send a mechanic or change out the crane 12 or take other necessary action.

Once the inspection is complete and the information forwarded from the smart device 110 to the hazard safety server 120 to the off-site owner 126, the operator O will have all of the information gathered from not only the field F, but the office as well. Such information may include any special requirements, such as use of riggers, signal person, or a lift director. The operator O may confirm each item with the person in charge and have the appropriate ticket signed on the smart device 110 which confirms the start time for the job ticket and other confirmations. Obtaining signatures is too often difficult or not done, which causes significant litigation concerns. In one embodiment, each of the heavy equipment hazard warning apparatuses 50, 100 provide an override connection with a governor to the respective pieces of heavy equipment that prevents operation until the ticket is signed and sent to the office to start operations. A second signature may be required when the project is finished. Once the final signature is obtained, the operator O may send the completed electronic document to the office and an invoice or time sheet for the day will be produced.

Figure 2A:
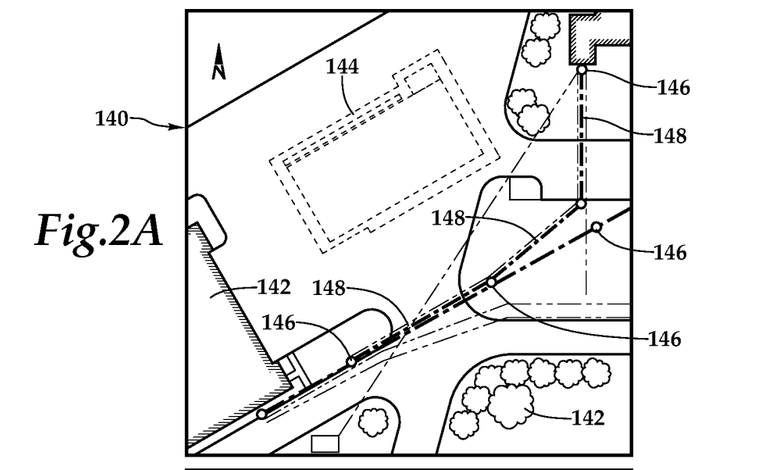
FIG. 2A is a computer generated view of a site plan of a site where the system will be practiced, according to the teachings presented herein.

Referring to FIG. 2A, one embodiment of a computer generated view 140 of a site plan of the field F is depicted. The computer generated view 140 may be embodied on the smart device 110. The location of an existing structure 142 and the planned structure 144 are shown. Also, the location of existing power line poles 146 is included in the site plan. Once an operator arrives at the site, the operator identifies any hazards, which in the illustrated case include the overhead power lines P. The operator reviews the location of the existing powerline poles 146 using any geolocation information embedded in the computer-generated view 140 of the site plan and the geolocationing functionality of the smart device 110. The operator then augments the site plan with the location of the overhead power lines 148 using the geolocationing functionality of the smart device 110.

Figure 2B:
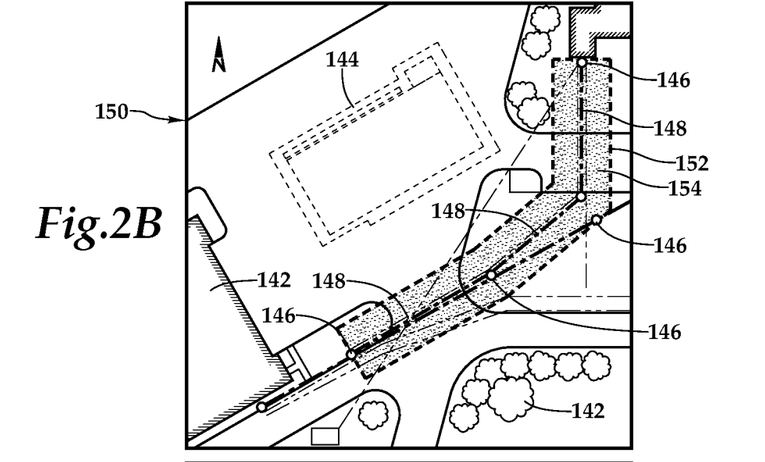
FIG. 2B is a computer generated view of an enhanced site plan of the site where the system will be practiced, according to the teachings presented herein.

Referring now to FIG. 2B, with reference to a computer-generated view 150, the operator using the hazard safety application determines a hazard geofence 152, which is a virtual boundary around the hazard, defining an area of encroachment 154. The hazard geofence 152 may be a distance such as 10 feet (3 meters), 15 feet (4.5 meters), or 20 feet (6 meters).

Figure 2C:
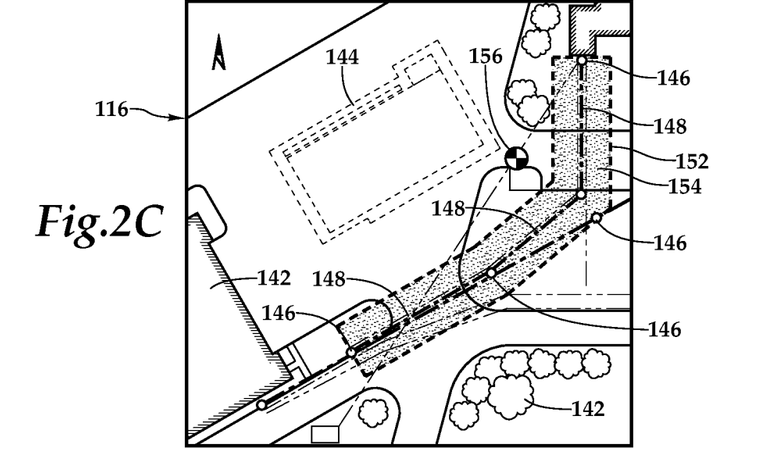
FIG. 2C is a computer generated view of a further enhanced site plan of the site where the system will be practiced, according to the teachings presented herein.

Referring now to FIG. 2C, with reference to the computer-generated view 158, the hazard safety application tracks the location of the heavy equipment as shown by tracking icon 156. The hazard safety application initializes an alert notification in response to the heavy equipment encroaching on the hazard geofence 152. The hazard safety application may also initialize a shutdown notification to the heavy equipment in response to the heavy equipment being proximate to the hazard.

Figure 3:
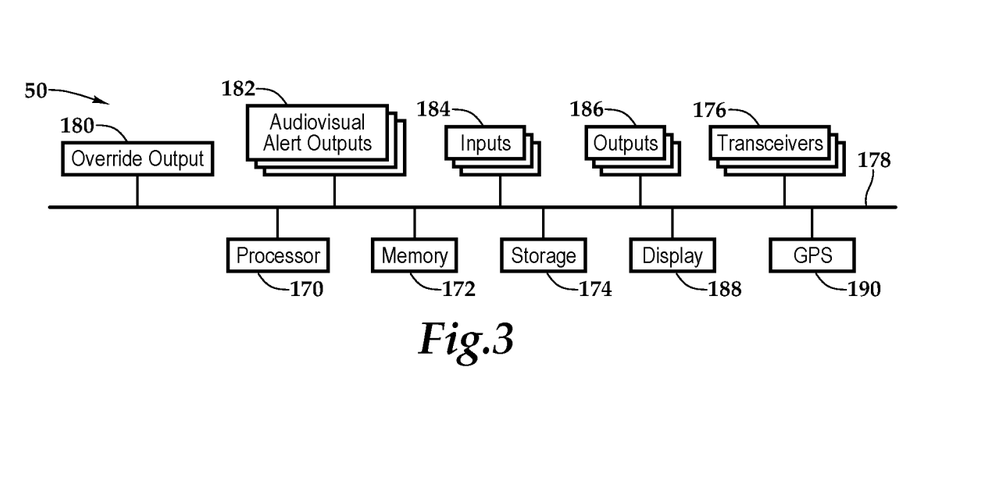
FIG. 3 is a functional block diagram depicting one embodiment of the heavy equipment hazard warning apparatus shown FIG. 1, according to the teachings presented herein.

Referring now to FIG. 3, within the housing 52, in one embodiment of the heavy equipment hazard warning apparatus 50, a processor 170, memory 172, storage 174, and one or more transceivers 176 are interconnected by a bus architecture 178 within a mounting architecture that supports an override output 180, audiovisual alert outputs 182, inputs 184, outputs 186, a display 188, and a Global Positioning System (GPS) unit 190. It should be understood that the processor 170, the memory 172, the storage 174, the inputs 184, the outputs 186, the display 188, and the GPS 190 may be entirely contained within the housing 52 or a housing-smart device combination leveraging the smart device 110. The processor 170 may process instructions for execution within the computing device, including instructions stored in the memory 172 or in the storage 174. The memory 172 stores information within the computing device. In one implementation, the memory 172 is a volatile memory unit or units. In another implementation, the memory 172 is a non-volatile memory unit or units. The storage 174 provides capacity that is capable of providing mass storage for the heavy equipment hazard warning apparatus 50. The various inputs 184 and outputs 186 provide connections to and from the computing device, wherein the inputs 184 are the signals or data received by the heavy equipment hazard warning apparatus 50, and the outputs 186 are the signals or data sent from the heavy equipment hazard warning apparatus 50.

The one or more transceivers 176 are associated with the heavy equipment hazard warning apparatus 50 and communicatively disposed with the bus 178. As shown, the transceiver 176 may be internal, external, or a combination thereof to the housing. Further, the transceiver 176 may be a transmitter/receiver, receiver, or an antenna for example. Communication between various devices and the heavy equipment hazard warning apparatus 50 may be enabled by a variety of wireless methodologies employed by the transceiver 176, including 802.11, 3G, 4G, Edge, WiFi, ZigBee, near field communications (NFC), Bluetooth low energy and Bluetooth, for example. The display 188 provides an electronic device for the visual display of information. The GPS unit 190 accesses a global navigation satellite system that uses a receiver and algorithms to provide location, velocity and time synchronization to provide locationing information for the GPS unit 190, and, in turn, the heavy equipment hazard warning apparatus 50 and the crawler crane 12. The override output 180 provides the interface to the heavy equipment to at least partially shut down the heavy equipment if the heavy equipment is too close to a hazard. The audiovisual alert outputs 182 provide the interfaces to the heavy equipment to actuate various audio and visual notifications, including alerts that may be relevant to the location of the heavy equipment. It should be appreciated that although one architecture of the heavy equipment hazard warning apparatus 50 is provided, other architectures are within the teachings presented herein. Further, it should be appreciated that the heavy equipment hazard warning apparatus 100 is similar in structure and function to the heavy equipment hazard warning apparatus 50.

The memory 172 and the storage 174 are accessible to the processor 170 and include processor-executable instructions that, when executed, cause the processor 170 to execute a series of operations. In one embodiment of processor-executable instructions, when executed, cause the processor 170 to receive a hazard safety site plan of the site. As mentioned, the hazard safety site plan may be a site plan of the site augmented with locationing information for a hazard with a hazard geofence therearound. The processor-executable instructions also cause the processor 170 to monitor the location of the heavy equipment with the global positioning system unit 190. In one implementation, the processor-executable instructions are caused to provide a visual of the hazard site plant to an operator of the heavy equipment via one of the outputs 186. The processor 170 is then caused to analyze the location of the heavy equipment with respect to the hazard safety site plan. The processor-executable instructions cause the processor 170 to initialize an alert notification via the audiovisual alert outputs 182 or outputs 186 at the heavy equipment in response to the heavy equipment encroaching on the hazard geofence. The processor-executable instructions cause the processor 170 to initialize a shutdown notification via the override output 180 at the heavy equipment in response to the heavy equipment being proximate to the hazard. In another embodiment of processor-executable instructions, when executed, cause the processor 170 to capture and store the heavy equipment data for analysis in an event of an incident occurring.

Figure 4:
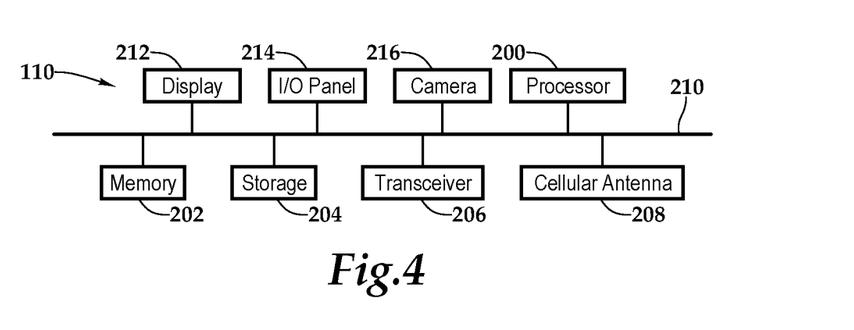
FIG. 4 is a functional block diagram depicting one embodiment of a smart device shown in FIG. 1, which may form a portion of the system.

Referring now to FIG. 4, the smart device 110 may be a wireless communication device of the type including various fixed, mobile, and/or portable devices. To expand rather than limit the discussion of the smart device 110, such devices may include, but are not limited to, cellular or mobile smart telephones, tablet computers, smartwatches, and so forth. The smart device 110 may include a processor 200, memory 202, storage 204, a transceiver 206, and a cellular antenna 208 interconnected by a busing architecture 210 that also supports a display 212, I/O panel 214, and a camera 216. It should be appreciated that although a particular architecture is explained, other designs and layouts are within the teachings presented herein.

In operation, the teachings presented herein permit the smart device 110 such as a smart tablet to create the hazard safety site plan, facilitate monitoring and reporting, and maintain the location of any heavy equipment at the site. As shown, the smart device 110 includes the memory 202 accessible to the processor 200 and the memory 202 includes processor-executable instructions that, when executed, cause the processor 200 to provide an interface for an operator that includes an interactive application for mapping one or more hazards at the site. The processor 200 is caused to load a site plan of the site. The processor 200 is then caused to prompt the operator to locate all hazards which may be located at the site. The operator utilizes the GPS functionality of the smart device 110 to document the location of the hazards by augmenting data to the site plan. By way of example and not by way of limitation, overhead power lines are documented by identifying the support poles and then by the operator interfacing with the smart device, augmenting the site plan with the overhead power lines by appropriately connecting the support poles to indicate overhead power lines. In one implementation, connecting the support poles to indicate overhead power lines may be achieved with the use of a stylus, for example. The processor 200 is then caused to designate a hazard geofence around the hazard. The hazard geofence may be a virtual boundary around the hazard. As mentioned, the hazard geofence may be a distance such as 10 feet (3 meters), 15 feet (4.5 meters), or 20 feet (6 meters).

As shown, the smart device 110 includes the memory 202 accessible to the processor 200 and the memory 202 includes processor-executable instructions that, when executed, cause the processor 200 to form a pairing with one or more of the heavy equipment hazard warning apparatuses 50, 100. The processor-executable instructions may function to further many of the processes discussed with respect to the heavy equipment hazard warning apparatuses 50, 100. By way of example, the processor 200 is caused to receive the heavy equipment data and forward the heavy equipment data to the cloud C.

In a still further embodiment of processor-executable instructions, the processor-executable instructions cause the processor 200 to provide an interface for an operator. The processor-executable instructions then cause the processor 200 to access data and resources at the hazard safety server 120 and the hazard safety database 124. The processor 200 is then caused to generate various reports. The processor-executable instructions may also cause the processor 200 to run an operational interface program that ensures the safe operation of the heavy equipment. The processor-executable instructions may also cause the processor 200 to operate an override connection with a governor of the heavy equipment that prevents operation until a ticket is signed and sent to the office to start operations. In one embodiment, following an occurrence of an incident, the processor-executable instructions cause a signal to be sent to the cloud C so that information and the data stored at the hazard safety database 124 about the heavy equipment is locked and only accessible by designated parties.

Figure 5:
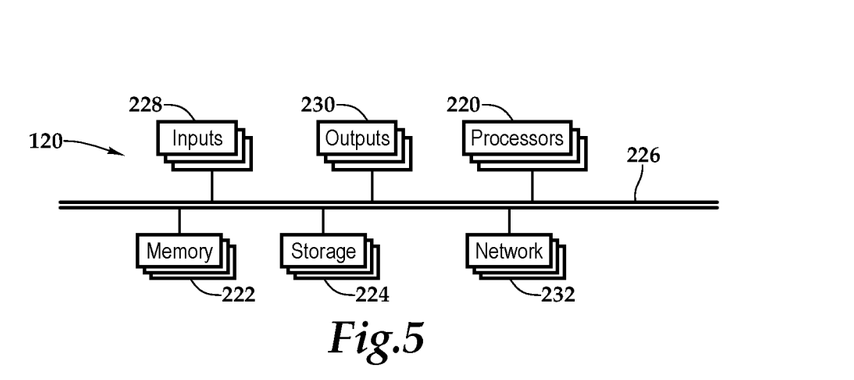
FIG. 5 is a functional block diagram depicting one embodiment of a server shown in FIG. 1, which may form a portion of the system.

Referring now to FIG. 5, one embodiment of the server 120 as a computing device includes, within the housing 122, a processor 220, memory 222, and storage 224 interconnected with various buses 226 in a common or distributed, for example, mounting architecture that also supports inputs 228, outputs 230, and network interface 232. In other implementations, in the computing device, multiple processors and/or multiple buses may be used, as appropriate, along with multiple memories and types of memory. Further still, in other implementations, multiple computing devices may be provided and operations distributed therebetween. The processor 220 may process instructions for execution within the server 120, including instructions stored in the memory 222 or in storage 224. The memory 222 stores information within the computing device. In one implementation, the memory 222 is a volatile memory unit or units. In another implementation, the memory 222 is a non-volatile memory unit or units. Storage 224 includes capacity that is capable of providing mass storage for the server 120, including hazard safety database storage capacity. Various inputs 228 and outputs 230 provide connections to and from the server 120, wherein the inputs 228 are the signals or data received by the server 120, and the outputs 230 are the signals or data sent from the server 120. The network interface 232 provides the necessary device controller to connect the server 120 to one or more networks.

The memory 222 is accessible to the processor 220 and includes processor-executable instructions that, when executed, cause the processor 220 to execute a series of operations. The processor-executable instructions cause the processor 220 to provide an interface for an off-site heavy equipment owner. The processor-executable instructions also cause the processor 220 to maintain the hazard safety database 124 in the storage 224. As discussed, the hazard safety database 124 may include information about the heavy equipment owner, a heavy equipment operator of the heavy equipment, and job information. The processor 220 is caused to receive the heavy equipment data from the heavy equipment apparatus 50 and/or smart device 110 and append the heavy equipment data to the heavy equipment database 124. In one embodiment, following the receipt of a signal from the heavy equipment apparatus 50 and/or smart device 110 that an incident has occurred, the information and the data stored at the heavy equipment database 124 about the heavy equipment is locked and only accessible by designated parties. Further, the processor 220 is caused to issue reports based on the heavy equipment data in the hazard safety database 124.

Figure 6:
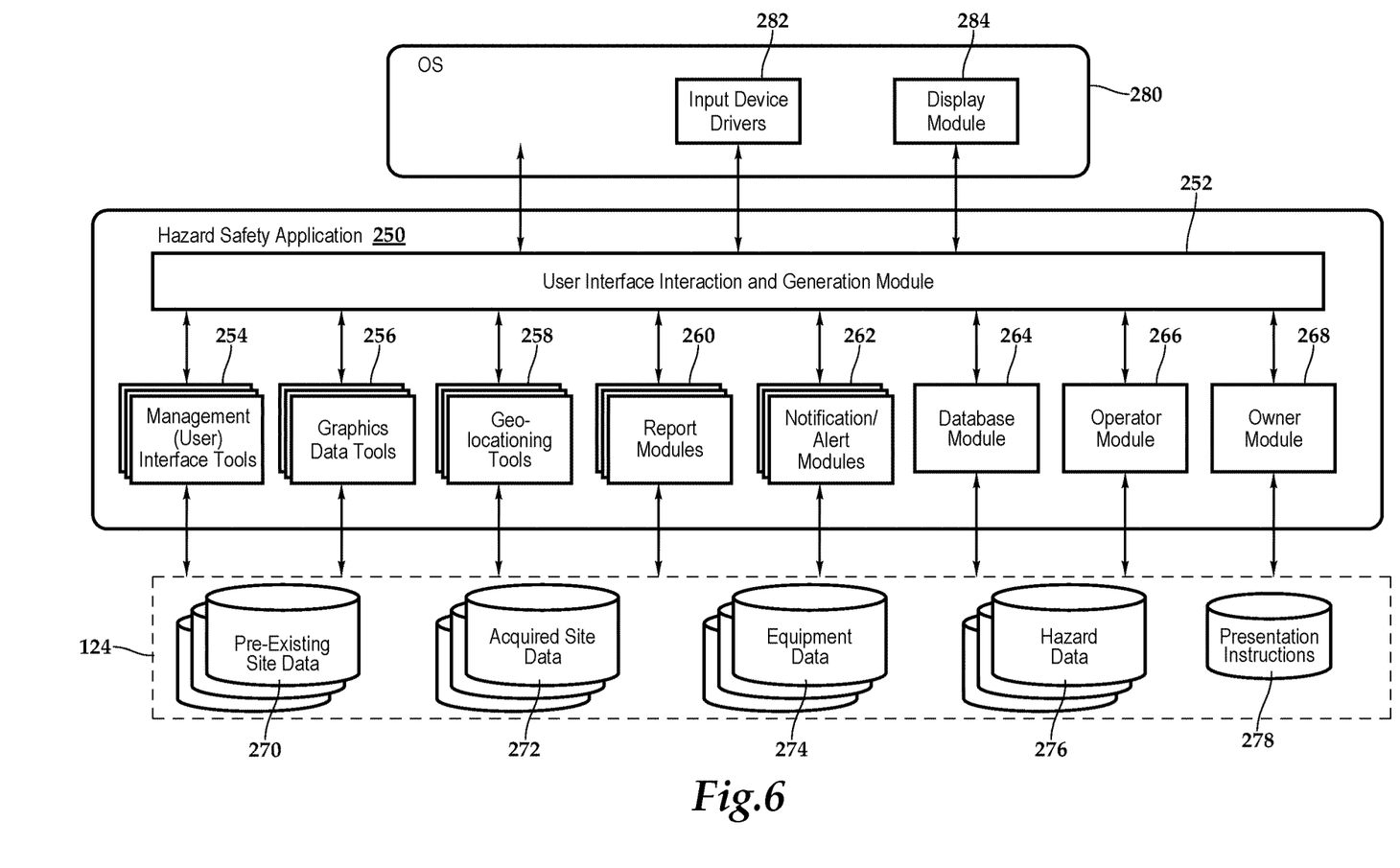
FIG. 6 is a conceptual module diagram depicting a software architecture of a hazard safety application of some embodiments.

FIG. 6 conceptually illustrates the software architecture of a hazard safety application 250 of some embodiments that may render information, such as the report 128, and notifications, such as the alerts 130, 132. In some embodiments, the hazard safety application 250 is a stand-alone application or is integrated into another application, while in other embodiments the application might be implemented within an operating system 280. Furthermore, in some embodiments, the hazard safety application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The hazard safety application 250 includes a user interface (UI) interaction and generation module 252, management (user) interface tools 254, graphics data tools 256, geolocationing tools 258, report modules 260, notification/alert modules 262, database module 264, operator module 266, and an owner module 268. The hazard safety application 250 has access to the hazard safety database 124, which in one embodiment, may include pre-existing site data 270, acquired site data 272, equipment data 274, hazard data 276, and presentation instructions 278, which presents instructions for the operation of the hazard safety application 250. In some embodiments, storages 270, 272, 274, 276, 278 are all stored in one physical storage. In other embodiments, the storages 270, 272, 274, 276, 278 are in separate physical storages, or one of the storages is in one physical storage while the other is in a different physical storage.

The hazard safety database 124, in one implementation, provides a database of all pertinent information required for a site, hazards, heavy equipment, owner and historical information of the heavy equipment, owner, and operator. The pre-existing site data 270 may include all the information of the operator assigned to the heavy equipment and site such as all experience and particularly certification documentation with a date of expiration. Recent "operator evaluation forms" may be included. The hazard safety server 120 may track the life and expiration of such forms and certificates to provide notifications prior to expiration when renewal is required. The pre-existing site data 270 may also include information about job assignments, including having input data on specific questions based on limitation containment in accordance with applicable local, state, and national standards. Such job input information may also include the job ticket specifying a job number and job name assignment. An operator may be assigned to a job number and job name assignment and the smart device being utilized by the operator may be employed to answer a series of questions concerning the need for riggers, signal person, and/or lift director. Such information may be provided with a confirmation mechanism. The job input information may also include a description of the load, load weight and load radius, for example. The UI interaction and generation module 252 generates a user interface that allows the end user to specify parameters that may be utilized to generate various reports and notifications.

The pre-existing site data 270 may also include any site plans which may be any type of architectural plan, landscape architecture document, or a detailed engineering drawing of proposed improvements to a given lot. A site plan usually shows a building footprint, travel ways, parking, drainage facilities, sanitary sewer lines, water lines, trails, lighting, landscaping and garden elements, as well as other utilities. The site plan may be provided in a CAD format or other format and may include geolocationing information therein. In one implementation, the site plan may include a computerized representation, such as a computerized grid, of the utilities at the location. Utility operators may adopt GPS mapping and locating technology to provide the ability to store and retrieve accurate location information nearly instantaneously regarding utilities. Such information may be used as part of the site plans. Furthermore, any observed inconsistencies or changes to the location information can be updated to continuously improve the quality and accuracy of the buried or above-ground infrastructure location data, including any verification notes created on-site as part of acquired site data 272 using the teachings presented herein. The acquired site data 272 may include information and data that is augmented to the pre-existing site data 270. Such information and data may include geolocationing data on hazards such as utilities to further improve the site data stored in the pre-existing site data 270.

The equipment data 274 may be all information concerning the type, make, model, and manufacturer of the heavy equipment as well as the date of manufacture. A copy of a current annual inspection/certification of the heavy equipment, a copy of all maintenance records, and documentation of the purchase of the heavy equipment, including current ownership information, may be included in the equipment data 274. The hazard data 276 may include all information about the utility including location, maintenance records, and safety information, for example. The presentation instructions 278 may include information and data that permits a user to utilize the hazard safety application 250 and navigate the features therein.

Once the parameters have been established for the generation of reports by default or by an end user utilizing the management (user) interface tools 254, the graphics data tools 256 operate on the site plan or other vector graphics data files with texture identifiers or two or three dimensional map image files specified in one or more map tiles that may be raster-based map tiles, for example. The graphics data tools 256 create the augmented data for the site plan to make the virtual model of the physical body of the hazard or hazards based on definitions derived from any GIS resources, such as a geodatabase, address location map document or geoprocessing model, or any two- or three-dimensional CAD-based drawings and plans. The geolocationing tools 258 interface with the geolocationing data embedded in the site plan and the geolocationing data provided on-site by the smart device, for example. This geolocationing information supports the graphics data tools 256 and the augmentation of the site plan. The report modules 260 may be executed to containerize and annotate the data elements to generate the required report or reports. The report modules 260 may also assist an investigator or owner in the event of incident occurring. The cloud C and, in particular, the heavy equipment database 124 captures and stores all data, which can be used to generate various reports following an incident. In one implementation, following an incident, all of the data stored in the cloud C may be locked and only accessible by designated parties. Additionally, by way of example, the reports modules 260 may generate crane usage reports that allow an owner to determine actual hours of use for financial evaluation of each crane. By way of further example, the report modules 260 may also provide detailed records about the service times and hours of each crane. Such records may be an asset for insurances purposes and stored at a main office of the owner.

The notification/alert modules 262 may be executed to provide notifications of varying levels of urgency to the off-site owner 126 or the operator O at the field F, for example. The notifications and alerts may be hazard related, as previously discussed, or job-site related or heavy equipment-related, for example. The database module 264 may be executed to obtain data from the hazard safety database 124. The operator module 266 provides the necessary interface or interfaces for the operator of the crane and, similarly, the owner module 268 provides the necessary interface or interfaces for the owner of the crane.

In the illustrated embodiment, FIG. 6 also includes an operating system 280 that includes input device driver(s) 282 and a display module 284. In some embodiments, as illustrated, the input device drivers 282 and display module 284 are part of the operating system 280 even when the hazard safety application 250 is an application separate from the operating system 280. The input device drivers 282 may include drivers for translating signals from a keyboard, mouse, touchpad, tablet, touch screen, gyroscope or accelerometer, for example. A user may use one or more of these input devices 282, which send signals to their corresponding device driver, in combination with the display module 284 to interact with the hazard safety application 250. The device driver then translates the signals into user input data that is provided to the UI interaction and generation module 252.

More particularly, use of heavy equipment in congested urban areas and highly volatile refinery operations restricts the capability of the operator to move without contacting a hazard such as a utility. The systems and methods presented herein meet the need for a specialized mechanism that provides additional knowledge about overturning by monitoring LMI data and crane data. Further, the systems and methods presented herein provide time, by actively monitoring heavy equipment location and the location of hazards, to provide an alert and prevent an accident.

Figure 7:
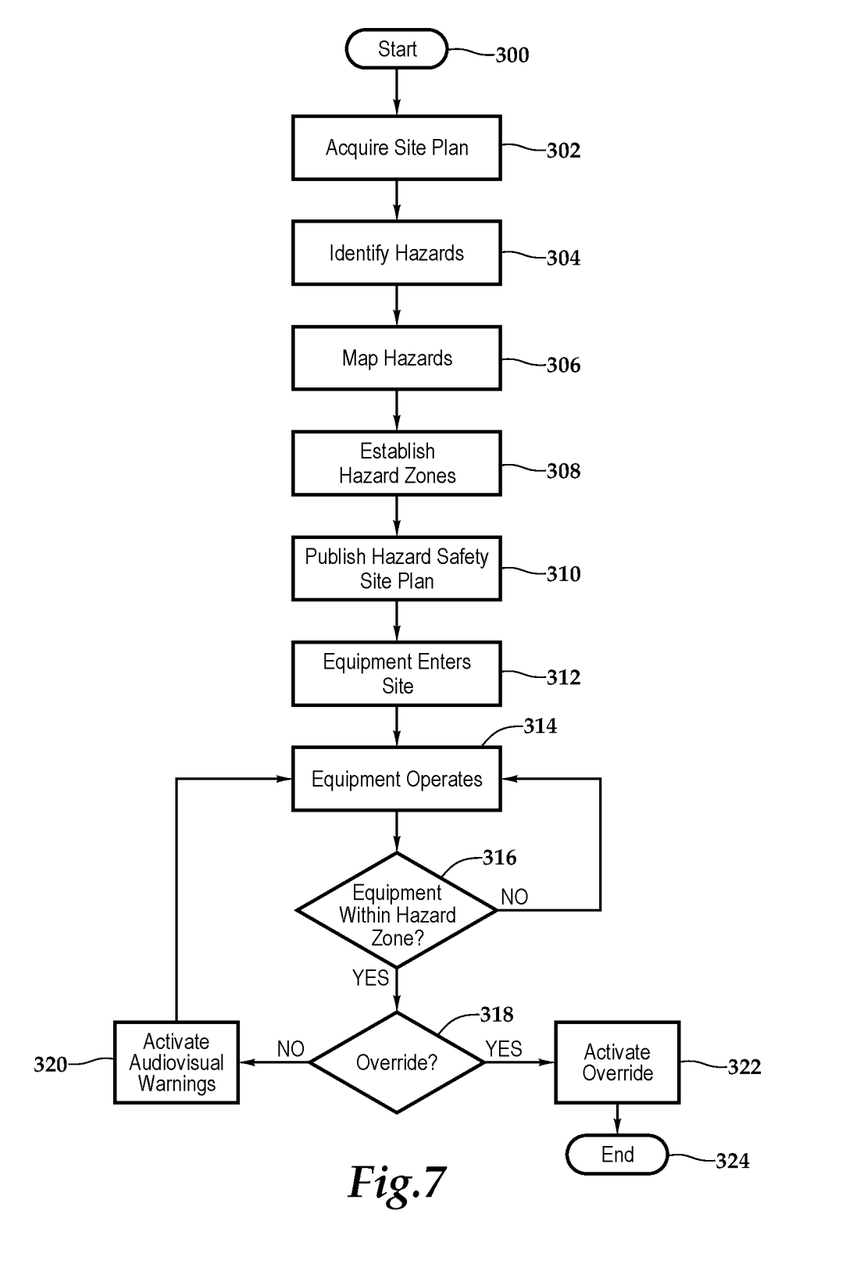
FIG. 7 is a flowchart depicting one embodiment of a method utilizing a heavy equipment hazard warning apparatus on a piece of heavy equipment, according to the teachings presented herein.

Referring to FIG. 7, one embodiment of a method for utilizing a heavy equipment hazard warning apparatus and providing hazard safety is shown. The methodology starts at block 300 with a smart device on-site to document the hazards, such as utilities at the site. At block 302, a site plan is acquired before identifying the hazards at block 304. At block 306, the hazards are mapped on the site plan and then hazard zones in the form of hazard geofences are established at block 308. The hazard safety site plan is then published at block 310. At block 312, heavy equipment with a heavy equipment warning apparatus enters the site. The heavy equipment warning apparatus includes the hazard safety plan loaded thereon. At block 314, as the heavy equipment operates, a GPS unit associated with the heavy equipment hazard warning apparatus determines the location of the heavy equipment at the site. In one embodiment, a visual of the hazard site plan is provided to the operator in the heavy equipment or an operator on-site to further safety.

At decision block 316, if the heavy equipment is not encroaching on the hazard zone then the methodology returns to block 314. On the other hand, if the heavy equipment is encroaching on the hazard zone then the methodology continues to decision block 318. If there is still sufficient distance between the heavy equipment and the hazards then an override is not required and at block 320, the methodology activates an audiovisual warning about the encroachment, which may include an audio alert or visual alert or both, prior to returning to block 314. If, however, an override is necessary due to the distance between the heavy equipment and the hazard then at block 322 an override is activated and the heavy equipment is at least partially shut down to prevent an accident from occurring. At block 324, the methodology concludes.

In the event an accident occurs, the operator of the heavy equipment hazard warning apparatus may activate an incident button that immediately stores all current data accumulated during operations to a restricted port in the cloud. The heavy equipment data can be retrieved and concise information is available for determining causation.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A heavy equipment hazard warning apparatus located on a piece of heavy equipment at a site, the heavy equipment hazard warning apparatus comprising:
   a housing securing a processor, a memory, a global positioning system unit, an audiovisual alert output, an override output, and a wireless transceiver thereat, the audiovisual alert output being disposed in communication with an audiovisual alert device associated with the heavy equipment, the override output being disposed in communication to an override associated with the heavy equipment, the override at least partially causing an equipment shutdown of the heavy equipment;
   a busing architecture communicatively interconnecting the processor, the memory, the global positioning system unit, the audiovisual alert output, the override output, and the wireless transceiver; and
   the memory accessible to the processor, the memory including processor-executable instructions that, when executed, cause the processor to:
      receive a hazard safety site plan of the site, the hazard safety site plan being a site plan of the site augmented with locationing information for a hazard with a hazard geofence therearound, the hazard geofence being a virtual boundary around the hazard,
      monitor, without data interaction with the hazard, the location of the heavy equipment with the global positioning system unit,
      analyze, without data interaction with the hazard, the location of the heavy equipment with respect to the hazard safety site plan,
      initialize, without data interaction with the hazard, an alert notification via the audiovisual alert output at the heavy equipment in response to the heavy equipment encroaching on the hazard geofence, and
initialize, without data interaction with the hazard, a shutdown notification via the override output at the heavy equipment in response to the heavy equipment being proximate to the hazard.

2. The heavy equipment hazard warning apparatus as recited in claim 1, wherein the audiovisual alert device associated with the heavy equipment further comprises a device selected from the group consisting of sirens, warning lights, instrument panels, and displays.

3. The heavy equipment hazard warning apparatus as recited in claim 1, wherein the heavy equipment further comprises a piece of equipment selected from the group consisting of earthwork equipment and construction equipment.

4. The heavy equipment hazard warning apparatus as recited in claim 1, wherein the heavy equipment further comprises a piece of equipment selected from the group consisting of drilling rigs, cranes, concrete pumps, dump trucks, aerial lifts, scissor lifts, high reach equipment, forklifts, scissor lift trucks, track hoes, back hoes, and large ditching machines.

5. The heavy equipment hazard warning apparatus as recited in claim 1, wherein the hazard safety site plan further comprises a plan created by an operator interacting with the site, the operator having a smart device and an application thereat for building the hazard geofence using the site plan with at least one hazard documented therein.

6. The heavy equipment hazard warning apparatus as recited in claim 1, wherein the hazard geofence comprises a distance selected from the group consisting of 10 feet (3 meters), 15 feet (4.5 meters), and 20 feet (6 meters).

7. The heavy equipment hazard warning apparatus as recited in claim 1, wherein the hazard further comprises an existing utility at the site.

8. The heavy equipment hazard warning apparatus as recited in claim 1, wherein the hazard further comprises an infrastructure selected from the group consisting of electrical power infrastructure, gas infrastructure, water infrastructure, cable infrastructure, and telecommunications infrastructure.

9. The heavy equipment hazard warning apparatus as recited in claim 1, wherein the hazard further comprises overhead power lines.

10. The heavy equipment hazard warning apparatus as recited in claim 1, wherein the housing is integral with the heavy equipment.

11. The heavy equipment hazard warning apparatus as recited in claim 1, wherein the heavy equipment hazard warning apparatus further comprises a pairing with a proximate smart device.

12. The heavy equipment hazard warning apparatus as recited in claim 1, wherein the housing further comprises a self-contained device that is issued when the heavy equipment enters the site.

13. The heavy equipment hazard warning apparatus as recited in claim 1, wherein the memory further includes processor-executable instructions that, when executed, cause the processor to capture and store heavy equipment data for analysis in an event of an incident occurring.

14. The heavy equipment hazard warning apparatus as recited in claim 13, wherein the heavy equipment data further comprises vehicle tracking information for the heavy equipment.

15. The heavy equipment hazard warning apparatus as recited in claim 13, wherein the heavy equipment data further comprises vehicle operating information for the heavy equipment.

16. The heavy equipment hazard warning apparatus as recited in claim 1, wherein the processor-executable instructions to initialize an alert notification via the audiovisual alert output at the heavy equipment in response to the heavy equipment entering the hazard geofence further comprise processor-executable instructions that, when executed, cause the processor to activate an audible alert at a crane.

17. The heavy equipment hazard warning apparatus as recited in claim 1, wherein the processor-executable instructions to initialize an alert notification via the audiovisual alert output at the heavy equipment in response to the heavy equipment entering the hazard geofence further comprise processor-executable instructions that, when executed, cause the processor to activate a visual alert at a crane.

18. The heavy equipment hazard warning apparatus as recited in claim 1, wherein the processor-executable instructions further comprise instructions that, when executed, cause the processor to provide a visual of the hazard site plan to an operator of the heavy equipment via an output communicatively interconnected to the busing architecture.

19. A heavy equipment hazard warning apparatus located on a piece of heavy equipment at a site, the heavy equipment hazard warning apparatus comprising:
a housing securing a processor, a memory, a global positioning system unit, an audiovisual alert output, and a wireless transceiver thereat, the audiovisual alert output being disposed in communication with an audiovisual alert device;
a busing architecture communicatively interconnecting the processor, the memory, the global positioning system unit, the audiovisual alert output, the override output, and the wireless transceiver; and
the memory accessible to the processor, the memory including processor-executable instructions that, when executed, cause the processor to:
receive a hazard safety site plan of the site, the hazard safety site plan being a site plan of the site augmented with locationing information for a hazard with a hazard geofence therearound, the hazard geofence being a virtual boundary around the hazard,
monitor the location of the heavy equipment with the global positioning system unit,
analyze, without data interaction with the hazard, the location of the heavy equipment with respect to the hazard safety site plan, and
initialize, without data interaction with the hazard, an alert notification via the audiovisual alert output at the heavy equipment in response to the heavy equipment encroaching on the hazard geofence.

20. A heavy equipment hazard warning apparatus located on a piece of heavy equipment at a site, the heavy equipment hazard warning apparatus comprising:
a hazard safety site plan of the site, the hazard safety site plan being a site plan of the site augmented with locationing information for a hazard with a hazard geofence therearound, the hazard being an existing utility at the site, the hazard geofence being a virtual boundary around the hazard, the hazard geofence being a distance selected from the group consisting of 10 feet (3 meters), 15 feet (4.5 meters), and 20 feet (6 meters);
a housing securing a processor, a memory, a global positioning system unit, an audiovisual alert output, an override output, and a wireless transceiver thereat, the audiovisual alert output being disposed in communication with an audiovisual alert device associated with the heavy equipment, the override output being disposed in communication to an override associated with the heavy equipment, the override at least partially causing an equipment shutdown of the heavy equipment;
a busing architecture communicatively interconnecting the processor, the memory, the global positioning system unit, the audiovisual alert output, the override output, and the wireless transceiver; and
the memory accessible to the processor, the memory including processor-executable instructions that, when executed, cause the processor to:
receive the hazard safety site plan of the site,
monitor the location of the heavy equipment with the global positioning system unit,
record the location of the heavy equipment at the site,
record operating information of the heavy equipment at the site,
analyze the location of the heavy equipment with respect to the hazard safety site plan,
initialize, without data interaction with the hazard, an alert notification via the audiovisual alert output at the heavy equipment in response to the heavy equipment encroaching on the hazard geofence, and
initialize, without data interaction with the hazard, a shutdown notification via the override output at the heavy equipment in response to the heavy equipment being proximate to the hazard.

* * * * *